(12) United States Patent
Yoshida

(10) Patent No.: US 12,520,211 B2
(45) Date of Patent: Jan. 6, 2026

(54) COMMUNICATION APPARATUS AND CONTROL METHOD

(71) Applicant: CANON KABUSHIKI KAISHA, Tokyo (JP)

(72) Inventor: Ibuki Yoshida, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 302 days.

(21) Appl. No.: 18/368,786

(22) Filed: Sep. 15, 2023

(65) Prior Publication Data

US 2024/0114409 A1 Apr. 4, 2024

(30) Foreign Application Priority Data

Sep. 29, 2022 (JP) ................................. 2022-156467

(51) Int. Cl.
*H04W 36/00* (2009.01)
(52) U.S. Cl.
CPC .................. *H04W 36/03* (2018.08)
(58) Field of Classification Search
CPC ............................. H04W 36/03; H04W 36/035
See application file for complete search history.

(56) References Cited

U.S. PATENT DOCUMENTS

| 9,554,027 | B2* | 1/2017 | Wu | H04N 1/00204 |
| 9,839,006 | B1* | 12/2017 | Zakaria | H04B 1/0057 |
| 10,142,825 | B2* | 11/2018 | Koike | H04W 4/80 |
| 10,271,368 | B2* | 4/2019 | Sambe | H04W 76/14 |
| 10,594,559 | B2* | 3/2020 | Ando | H04W 76/15 |
| 11,082,600 | B2 | 8/2021 | Tokunaga | |
| 11,991,067 | B2* | 5/2024 | Meyer | H04L 45/245 |
| 2005/0223298 | A1* | 10/2005 | Higuchi | G06F 11/3648 714/E11.171 |
| 2009/0284388 | A1* | 11/2009 | Uchiike | H04W 52/0241 348/207.99 |
| 2014/0097934 | A1* | 4/2014 | Su | G08C 17/02 340/3.1 |
| 2014/0187163 | A1* | 7/2014 | Fujita | H04W 36/362 455/41.2 |
| 2015/0289067 | A1* | 10/2015 | Riepenhoff | H01Q 21/28 381/315 |

(Continued)

FOREIGN PATENT DOCUMENTS

JP 2019-193020 A 10/2019

*Primary Examiner* — Dominic E Rego
(74) *Attorney, Agent, or Firm* — VENABLE LLP

(57) ABSTRACT

A communication apparatus, in a state that the communication apparatus and an external apparatus are connected via a first communication unit, enables execution of a first function of the external apparatus requiring a connection via the first communication unit and, in a state that the communication apparatus and the external apparatus are connected via a second communication unit, enables execution of a second function of the external apparatus requiring a connection via the second communication unit. According to an instruction to execute the first function in a state that the communication apparatus and the external apparatus are connected via the second communication unit using a connection with the first communication unit, the control unit disconnects a connection with the external apparatus via the second communication unit and executes the first function.

13 Claims, 10 Drawing Sheets

(56) References Cited

U.S. PATENT DOCUMENTS

| | | | | |
|---|---|---|---|---|
| 2016/0036956 | A1* | 2/2016 | Debates | H04M 1/72406 |
| | | | | 455/419 |
| 2016/0227097 | A1* | 8/2016 | Tanaka | H04N 23/661 |
| 2016/0381553 | A1* | 12/2016 | Lee | H04L 67/34 |
| | | | | 455/411 |
| 2017/0060518 | A1* | 3/2017 | Hong | G06F 3/0482 |
| 2017/0127384 | A1* | 5/2017 | Shimada | H04W 76/12 |
| 2017/0339734 | A1* | 11/2017 | Sambe | H04W 76/19 |
| 2018/0014242 | A1* | 1/2018 | Furuta | H04W 40/22 |
| 2018/0263078 | A1* | 9/2018 | Asakura | H04W 8/24 |
| 2019/0320407 | A1* | 10/2019 | Goyal | H04L 41/5058 |
| 2019/0387123 | A1* | 12/2019 | Yasuzaki | H04N 1/33384 |
| 2021/0091887 | A1* | 3/2021 | Cho | H04L 1/0061 |
| 2022/0015164 | A1* | 1/2022 | Li | H04W 76/30 |
| 2022/0198430 | A1* | 6/2022 | Jin | G06Q 20/327 |
| 2023/0327977 | A1* | 10/2023 | Abedini | H04W 40/02 |

\* cited by examiner

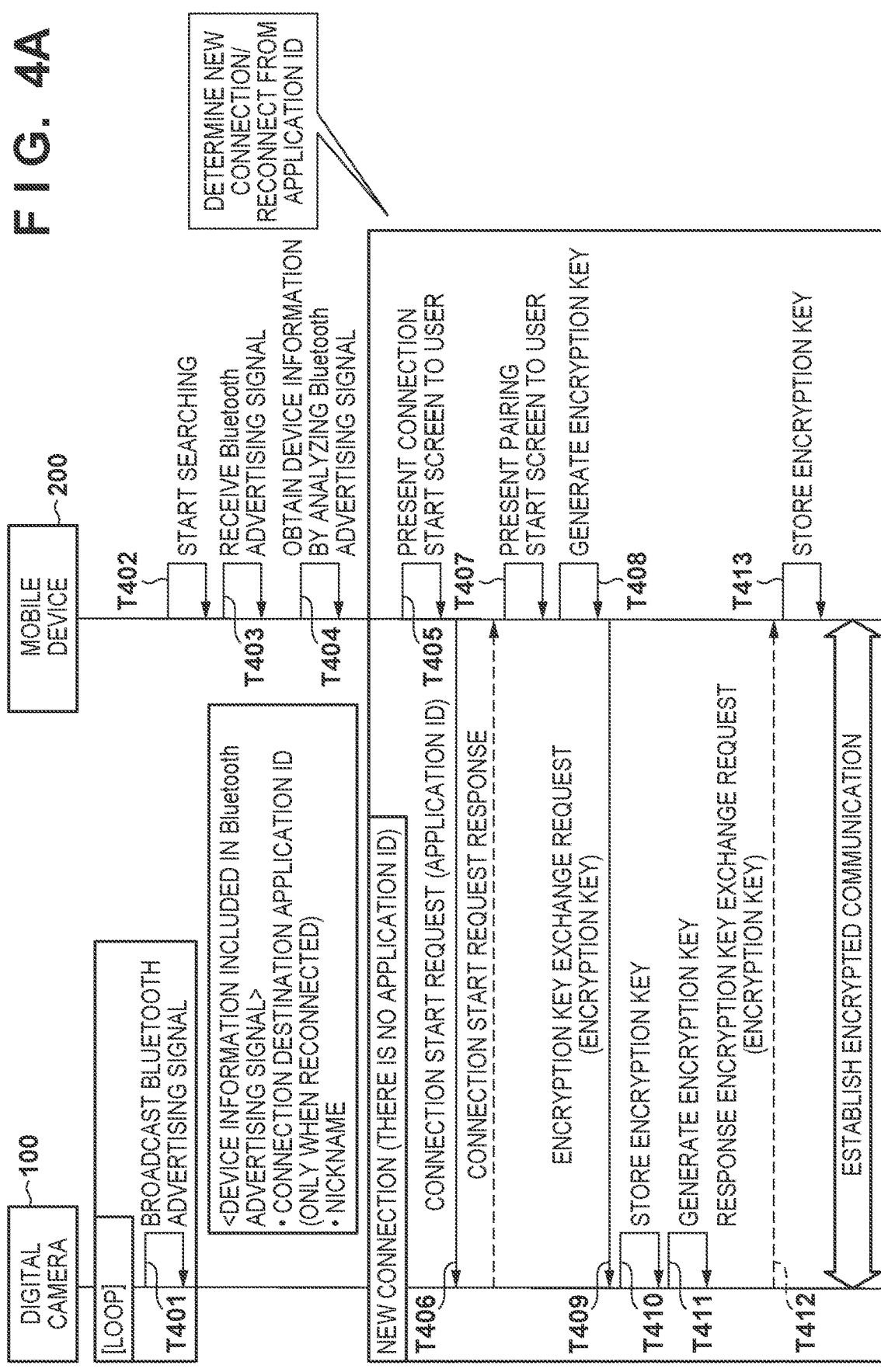

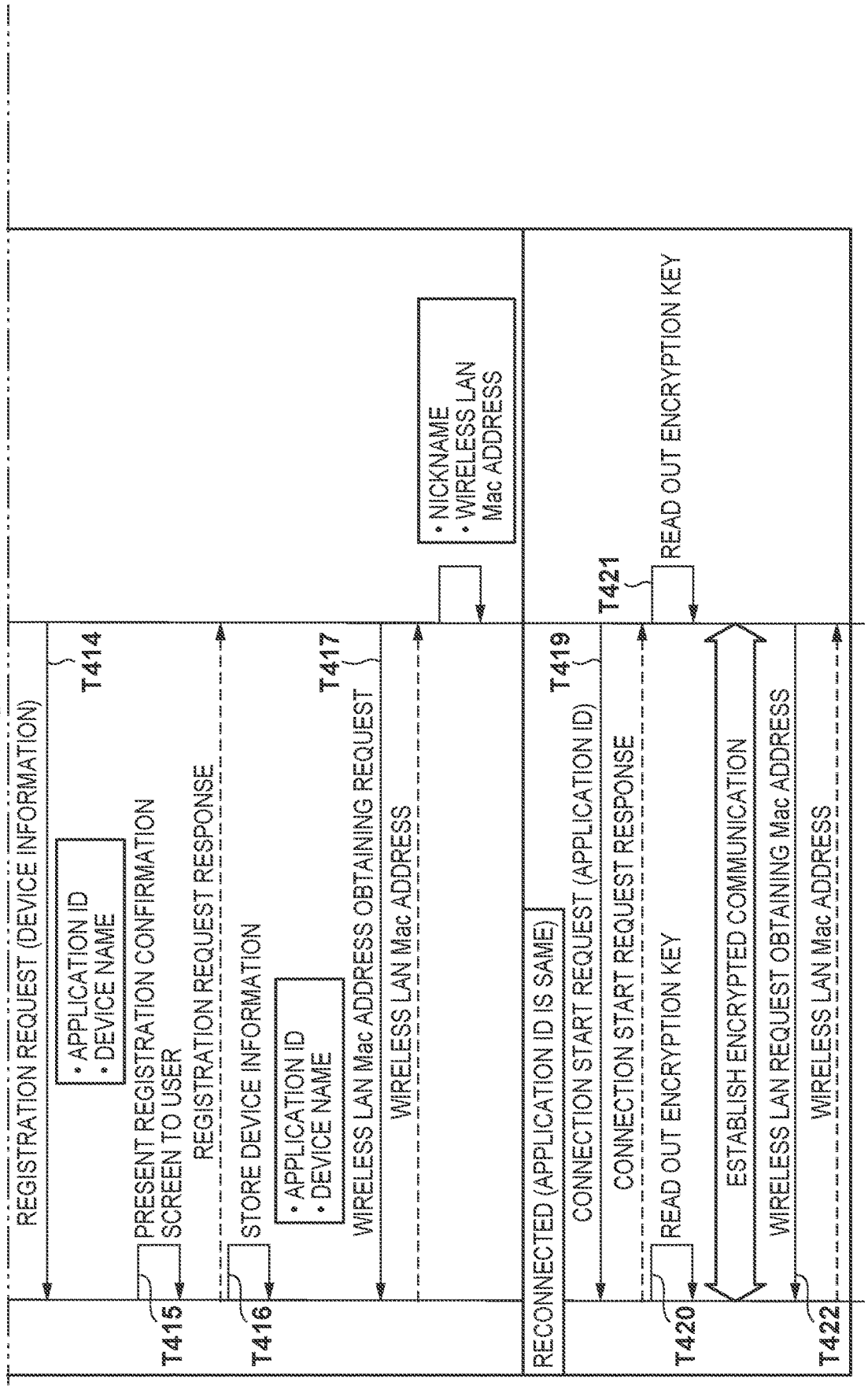

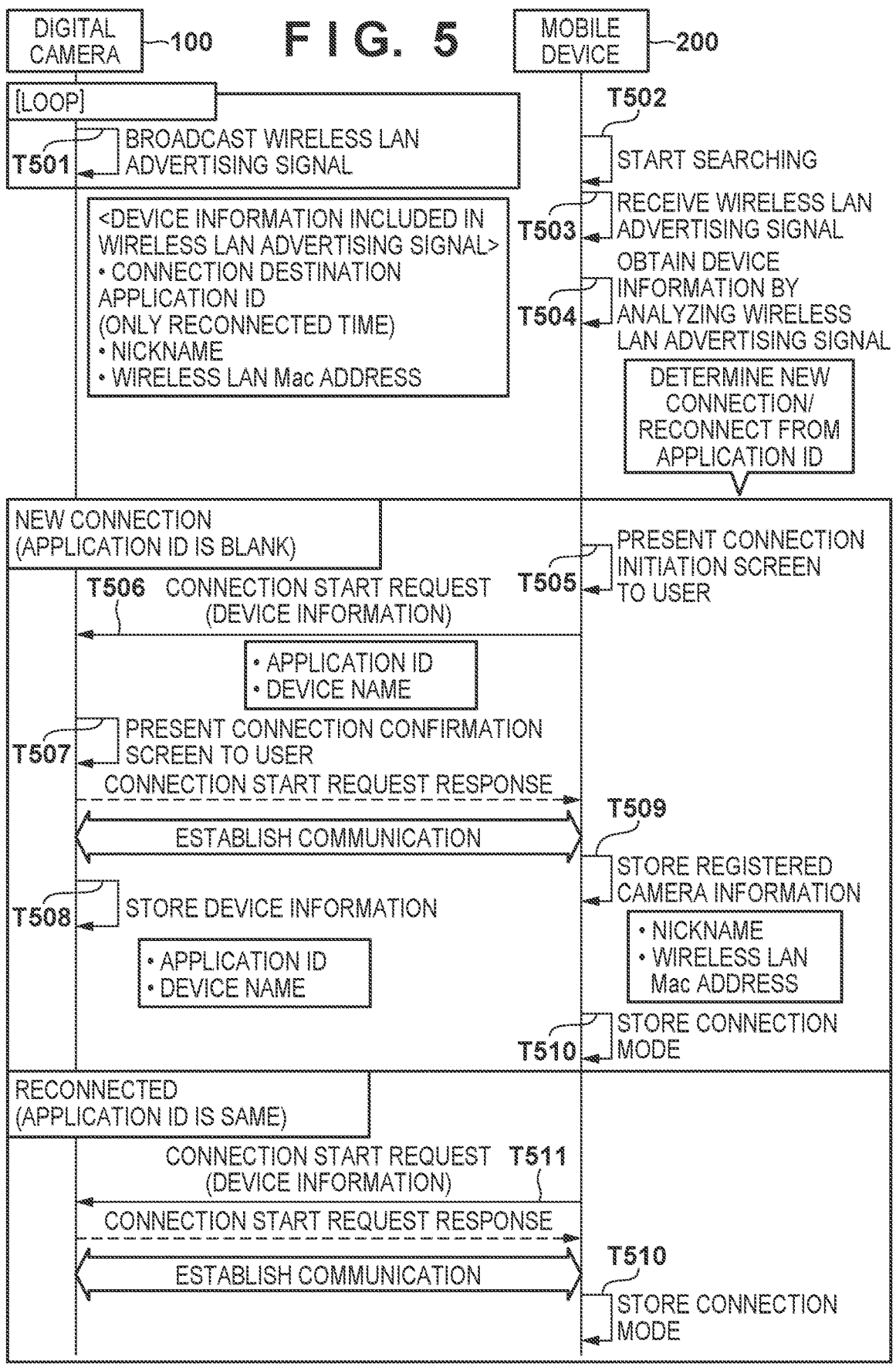

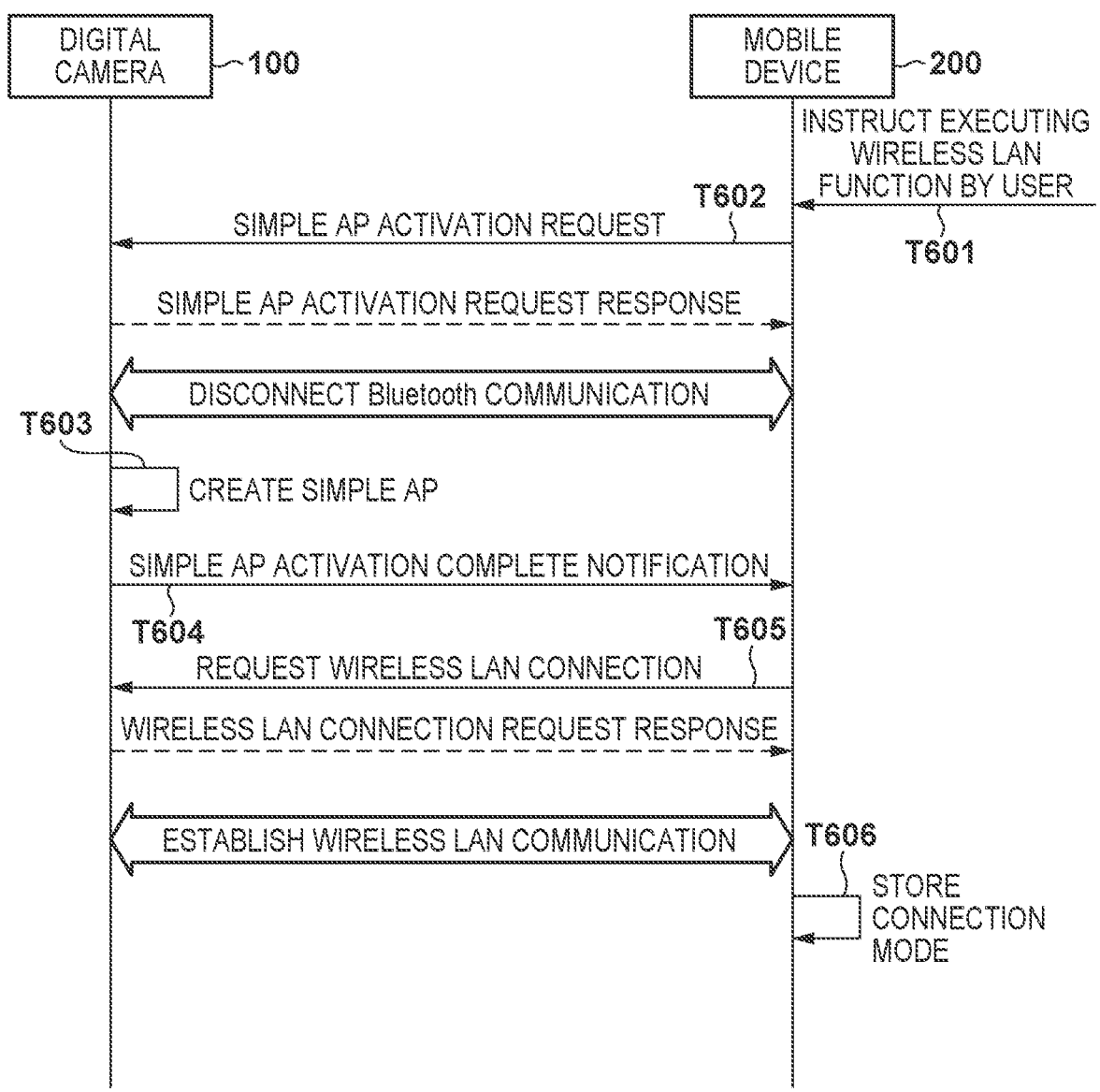

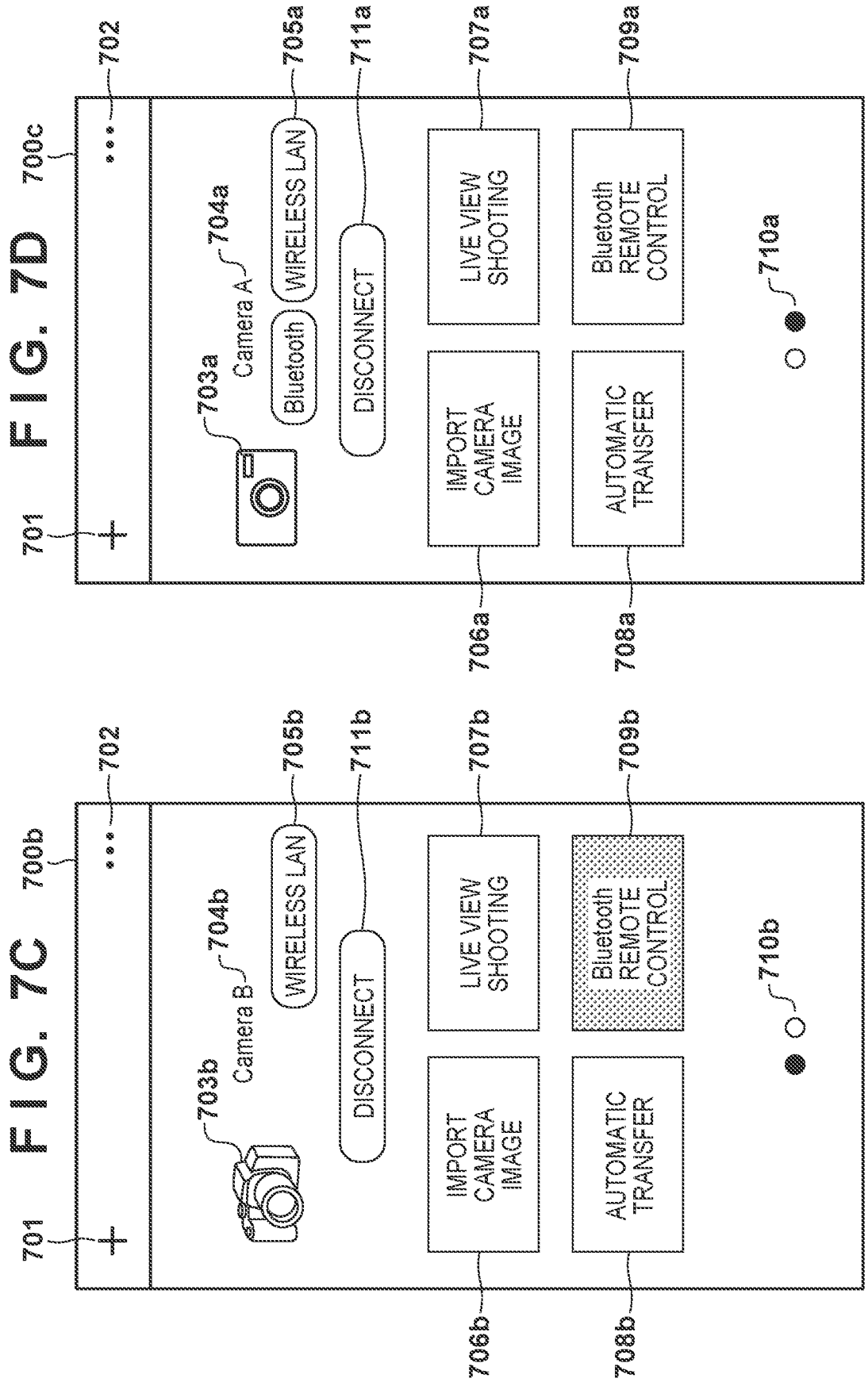

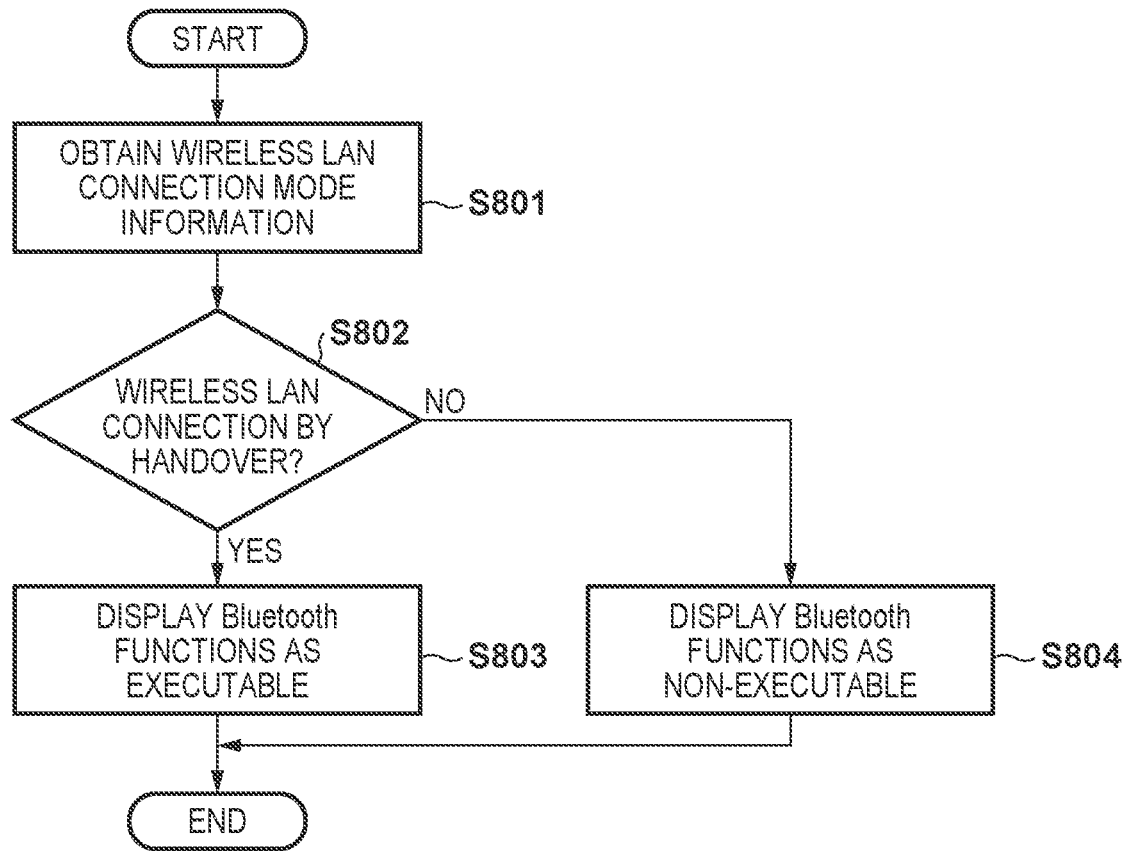

COMMUNICATION APPARATUS AND CONTROL METHOD

BACKGROUND OF THE INVENTION

Field of the Invention

The present invention relates to techniques for connecting a communication apparatus to an external apparatus to be able to wirelessly communicate with each other.

Description of the Related Art

Handover is known as a technique for connecting an image capture apparatus such as a digital camera to a communication apparatus such as a mobile device to be able to wirelessly communicate with each other. Handover is a technique that simplifies connection operations by using a short-distance wireless communication method such as Near Field Communication (NFC) or Bluetooth® to obtain information (SSID, password, etc.) for connecting the communication apparatus to an access point (AP) such as a wireless Local Area Network (LAN) from the image capture apparatus (see Japanese Patent Laid-Open No. 2019-193020). Also, techniques for storing information of an image capture apparatus that has previously connected to a communication apparatus and simplifying operations when reconnected are known.

However, to execute a function that requires a short-range wireless communication connection, such as Bluetooth or the like, in the image capture apparatus while the image capture apparatus and the communication apparatus are connected via wireless LAN, the wireless LAN connection must be disconnected in some cases. In such cases, the user needs to perform an operation to disconnect the wireless LAN connection, meaning that the function requiring the short-range wireless communication connection cannot be promptly executed in the image capture apparatus.

SUMMARY OF THE INVENTION

The present invention has been made in consideration of the aforementioned problems, and realizes techniques for enabling a function requiring a second wireless communication connection to be promptly executed without the user performing an operation to disconnect a first wireless communication.

In order to solve the aforementioned problems, the present invention provides a communication apparatus comprising: a first communication unit that is connectable to an external apparatus via a first wireless communication method; a second communication unit that is connectable to the external apparatus via a second wireless communication method different from the first wireless communication method; and a control unit that, in a state in which the communication apparatus is connected with the external apparatus via the first communication unit, enables execution of a first function of the external apparatus requiring a connection via the first communication unit and, in a state in which the communication apparatus is connected with the external apparatus via the second communication unit, enables execution of a second function of the external apparatus requiring a connection via the second communication unit, wherein, when the control unit accepts an instruction to execute the first function in a state in which the communication apparatus is connected to the external apparatus via the second communication unit using a connection with the first communication unit, the control unit disconnects a connection with the external apparatus via the second communication unit and executes the first function.

In order to solve the aforementioned problems, the present invention provides a method of controlling a communication apparatus comprising: wherein the communication apparatus includes a first communication unit that is connectable to an external apparatus via a first wireless communication method, and a second communication unit that is connectable to an external apparatus via a second wireless communication method different from the first wireless communication method, and wherein the method includes performing control to, in a state in which the communication apparatus is connected with the external apparatus via the first communication unit, enable execution of a first function of the external apparatus requiring a connection via the first communication unit and, in a state in which the communication apparatus is connected with the external apparatus via the second communication unit, enable execution of a second function of the external apparatus requiring a connection via the second communication unit, and in performing the control, in a case where the control unit accepts an instruction to execute the first function in a state in which the communication apparatus is connected to the external apparatus via the second communication unit using a connection with the first communication unit, disconnecting a connection with the external apparatus via the second communication unit and executing the first function.

In order to solve the aforementioned problems, the present invention provides a non-transitory computer-readable storage medium storing a program for causing a computer to function as a communication apparatus comprising: a first communication unit that is connectable to an external apparatus via a first wireless communication method; a second communication unit that is connectable to the external apparatus via a second wireless communication method different from the first wireless communication method; and a control unit that, in a state in which the communication apparatus is connected with the external apparatus via the first communication unit, enables execution of a first function of the external apparatus requiring a connection via the first communication unit and, in a state in which the communication apparatus is connected with the external apparatus via the second communication unit, enables execution of a second function of the external apparatus requiring a connection via the second communication unit, wherein, when the control unit accepts an instruction to execute the first function in a state in which the communication apparatus is connected to the external apparatus via the second communication unit using a connection with the first communication unit, the control unit disconnects a connection with the external apparatus via the second communication unit and executes the first function.

According to the present invention, a function requiring a second wireless communication connection can be executed promptly without a user performing an operation to disconnect a first wireless communication.

Further features of the present invention will become apparent from the following description of exemplary embodiments (with reference to the attached drawings).

BRIEF DESCRIPTION OF THE DRAWINGS

FIGS. 4A and 4B are sequence diagrams illustrating Bluetooth connection processing for the digital camera and the mobile device according to the present embodiment.

FIG. 5 is a sequence diagram illustrating wireless LAN connection processing for the digital camera and the mobile device according to the present embodiment.

FIG. 6 is a sequence diagram illustrating connection processing via a handover for the digital camera and the mobile device according to the present embodiment.

FIGS. 7A to 7D are diagrams illustrating examples of screens of a camera communication application of the mobile device according to the present embodiment.

FIG. 8 is a flowchart illustrating control processing by the mobile device according to the present embodiment.

DESCRIPTION OF THE EMBODIMENTS

Figure 1:
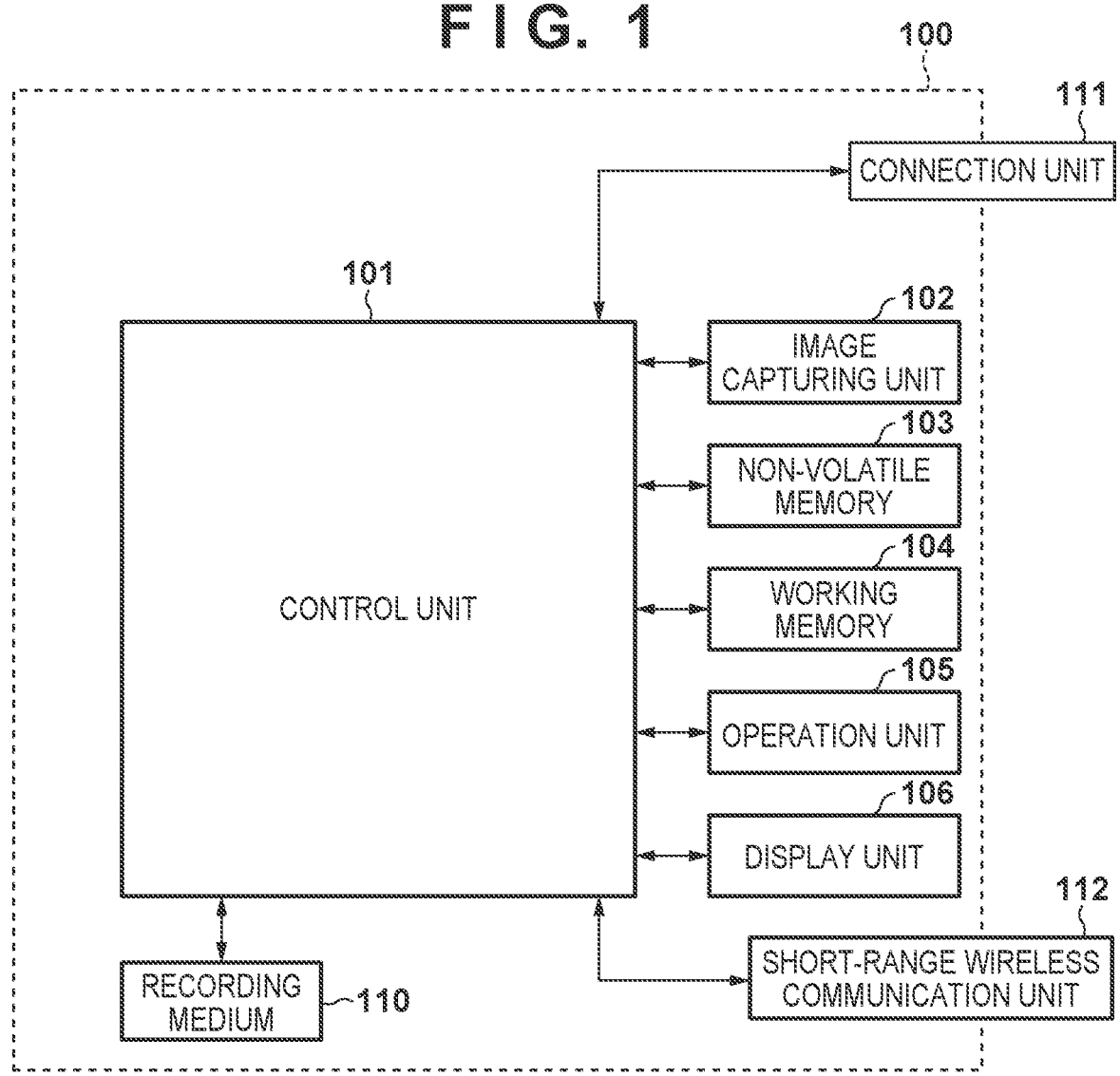
FIG. 1 is a block diagram illustrating a configuration of a digital camera according to the present embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

A system in which a communication apparatus and an image capture apparatus are connectable by a wireless communication method according to the present embodiment will be described below.

Note that the communication apparatus according to the present embodiment includes a smartphone, a tablet computer, a smartwatch, smart glasses, or other smart device or mobile device. However, no such limitation is intended, and the communication apparatus may be an information processing apparatus such as a personal computer with a wireless communication function or an image capture apparatus such as a digital camera. Also, the image capture apparatus according to the present embodiment is not limited to being a digital camera and may be a smart device with a camera function and a wireless communication function or a mobile device.

Also, in the present embodiment described below, the communication apparatus is applied to a mobile device and the image capture apparatus is applied to a digital camera. Also, when the mobile device is the communication apparatus, the communication partner digital camera is an external apparatus, but when the digital camera is the communication apparatus, the communication partner mobile device is an external apparatus.

In the processing according to the present embodiment described below, when a function requiring a Bluetooth connection is to be executed during a wireless LAN connection between a digital camera 100 and a mobile device 200, the function requiring a Bluetooth connection can be executed without the user performing an operation to disconnect the wireless LAN connection.

Configuration of Digital Camera 100

First, the configuration and function of the digital camera 100 according to the present embodiment will be described with reference to FIG. 1.

A control unit 101 is an arithmetic processing unit (CPU) that controls the entire digital camera 100 and implements communication processing and control processing described below by executing a program stored in a non-volatile memory 103 described below. Note that instead of the control unit 101 controlling the entire apparatus, a plurality of hardware may share the processing to control the entire apparatus.

An image capturing unit 102 includes a lens group including a zoom lens and a focus lens and a shutter with a diaphragm function. Also, the image capturing unit 102 includes an image sensor constituted by a CCD or CMOS element or the like that converts an object image into an electrical signal and an A/D converter that converts an analog image signal output from the image sensor into a digital signal. The image capturing unit 102, via control by the control unit 101, converts, via the image sensor, object image light formed by the lens included in the image capturing unit 102 into an electrical signal, performs noise reduction processing and the like, and outputs image data based on the digital signal.

The control unit 101 executes pixel interpolation, resize processing to reduce size, and color conversion processing on image data captured by the image capturing unit 102. Also, the control unit 101 compresses and encodes still image data on which an image processing has been given using JPEG or the like or encodes moving image data via a moving image compression method, such as MPEG2 or H.264, and generates an image file, which is then recorded in a recording medium 110. In the digital camera 100 of the present embodiment, the image data is recorded in the recording medium 110 in accordance with Design rule for Camera File system (DCF) standards. Also, the control unit 101 performs predetermined arithmetic processing using the captured image data and executes automatic focus (AF) processing and automatic exposure (AE) processing by the control unit 101 controlling the focus lens, the diaphragm, and the shutter of the image capturing unit 102 on the basis of the obtained calculation result.

The non-volatile memory 103 is a memory which is electrically erasable and recordable. The memory such as EEPROM is used as the non-volatile memory 103, for example. Constants, programs, and the like for operation of the control unit 101 are recorded in the non-volatile memory 103. Herein, programs refer to programs for executing control processing described below in the present embodiment.

Constants and variables for operation of the control unit 101 and programs read out from the non-volatile memory 103 are loaded on a working memory 104 used as a work area. Also, the working memory 104 is used as buffer memory that temporarily stores image data captured by the image capturing unit 102 or an image display memory for a display unit 106.

An operation unit 105 includes operation members such as various types of switches, buttons, and dials for accepting various operations from a user. The operation unit 105 includes, for example, a power button for turning on and off the power supply, a shutter button for giving a shooting instruction of an image, a reproduction button for giving a reproduction instruction of an image, and a mode button for changing the operation mode of the digital camera 100. Also, the operation unit 105 includes a dedicated connection button for starting communications with an external apparatus such as the mobile device 200 described below. Furthermore, the operation unit 105 includes a touch panel that is integrally configured with the display unit 106 described below.

The shutter button turns on halfway through the operation, or in other words when half pressed (a shooting preparation instruction), and generates a first shutter switch signal SW1. In response to the first shutter switch signal SW1, the control unit 101 starts operations such as automatic focus (AF) processing, automatic exposure (AE) processing, automatic white balance (AWB) processing, and pre-flash emission (EF) processing by controlling the image capturing unit 102. Also, the shutter button turns on when the operation of the shutter button is completed, or in other words when fully pressed (a shooting instruction), and generates a second shutter switch signal SW2. In response to the second shutter switch signal SW2, the control unit 101 starts a series of shooting processing operations from reading out a signal from the image capturing unit 102 to writing the image data on the recording medium 110.

The display unit 106 performs displays of live view images, displays of shot images, displays of characters for interactive operations, and the like. The display unit 106 is constituted by a display device such as a liquid crystal display or an organic EL display, for example. The display unit 106 may be integrally formed with the digital camera 100 or may be an external apparatus connected to the digital camera 100. The digital camera 100 is only required to be able to connect the display unit 106 and control the display of the display unit 106.

The recording medium 110 is used to record image files generated by the control unit 101 or to read out image files already recorded on the recording medium 110 by the control unit 101. The recording medium 110 may be a memory card or a hard disk drive installed in the digital camera 100 or may be a flash memory or a hard disk drive built-in the digital camera 100. The digital camera 100 is only required to be able to access the recording medium 110.

The digital camera 100 of the present embodiment has a shooting mode for shooting images and a reproduction mode for displaying images on the display unit 106. In the reproduction mode, image files recorded on the recording medium 110 are read out and displayed on the display unit 106. The image files recorded on the recording medium 110 can be not only images shot by the digital camera 100, but also, for example, images shot by an external apparatus to which the recording medium 110 is attached, or images received from an external apparatus via the connection unit 111 described below.

The reproduction mode includes two submodes. The submodes include a single reproduction mode in which one image is displayed on the full screen of the display unit 106 and a multi-reproduction mode in which a plurality of images are displayed on the full screen of the display unit 106. Note that the number of images displayed in the multi-reproduction mode can be changed by a user operation. The user can operate a dial included in the operation unit 105, display a total of nine images in a 3×3 pattern, or display a total of 25 images in a 5×5 pattern. Note that the operation member for changing the number of images in the multi-reproduction mode may also function as the zoom lever. With this configuration, when the zoom lever is operated to the zoom-in side, the number of images displayed is increased, and when the zoom lever is operated to the wide-angle side, the number of images displayed is decreased. With such a configuration, the user is provided with a more intuitive operating experience. Note that when the number of images displayed reaches a predetermined number and the zoom lever is further operated to the zoom-in side, the mode transitions from the multi-reproduction mode to the single reproduction mode. Conversely, when the number of images displayed reaches a predetermined number and the zoom lever is further operated to the wide-angle side, the mode transitions from the single reproduction mode to the multi-reproduction mode.

A connection unit 111 includes a communication interface for wirelessly communicating with an external apparatus. The digital camera 100 of the present embodiment is capable of transmitting and receiving data with an external apparatus via the connection unit 111. For example, image data generated by the image capturing unit 102 may be transmitted to an external apparatus via the connection unit 111. Note that in the present embodiment, the connection unit 111 includes an antenna and a communication circuit for communicating via a wireless LAN with an external apparatus in accordance with IEEE 802.11 standards. The control unit 101 implements wireless communication with an external apparatus by controlling the connection unit 111. Note that the communication method is not limited to a wireless LAN, and other methods may include a wireless communication interfaces such as an infrared communication interface or a wireless USB.

The connection unit 111 of the digital camera 100 according to the present embodiment includes an access point (AP) mode for operating as an access point in the infrastructure mode and a client (CL) mode for operating as a client in infrastructure mode. Also, when the connection unit 111 operates in CL mode, the digital camera 100 of the present embodiment is capable of operating as a CL device in infrastructure mode. When the digital camera 100 is operating as a CL device, the digital camera 100 is capable of joining a network created by an AP device by connecting to an AP device nearby. Also, when the connection unit 111 operates in AP mode, the digital camera 100 of the present embodiment is capable of operating as a simple AP (hereinafter, simple AP), which is a type of AP with limited functionality. When the digital camera 100 operates as a simple AP, the digital camera 100 itself creates a network. A device near the digital camera 100 can recognize the digital camera 100 as an AP device and join the network created by the digital camera 100. Whether the digital camera 100 is operated in AP mode or CL mode can be determined and controlled by the control unit 101 based on information obtained from the mobile device 200 by a short-range wireless communication unit 112 described below. The program for operating the digital camera 100 in AP mode or CL mode is stored in the non-volatile memory 103.

Note that although the digital camera 100 according to the present embodiment is a type of AP, it is a simple AP without a gateway function for transferring data received from a CL device to an internet provider or the like. Accordingly, the digital camera 100 is not capable of transferring data received from an external apparatus joined to the network created by the digital camera 100 to a network such as the Internet.

The short-range wireless communication unit 112, for example, includes an antenna for wireless communication and a modulation/demodulation circuit and a communication controller for processing wireless signals. The short distance wireless communication unit 112 outputs a modulated wireless signal from the antenna or demodulates a wireless signal received by the antenna to implement short distance wireless communication in accordance with IEEE 802.15 standards (Bluetooth®). In the present embodiment, communications using Bluetooth use Bluetooth Low Energy (BLE) version 4.0, which has low power consumption. Communications using Bluetooth have a narrower communicable range than communications using a wireless LAN (in other words, have a shorter communicable distance). Also, communications using Bluetooth have slower communication speeds than communications using a wireless LAN. However, communications using Bluetooth have a lower power consumption than communications using a wireless LAN.

Hardware Configuration of Mobile Device 200

Figure 2:
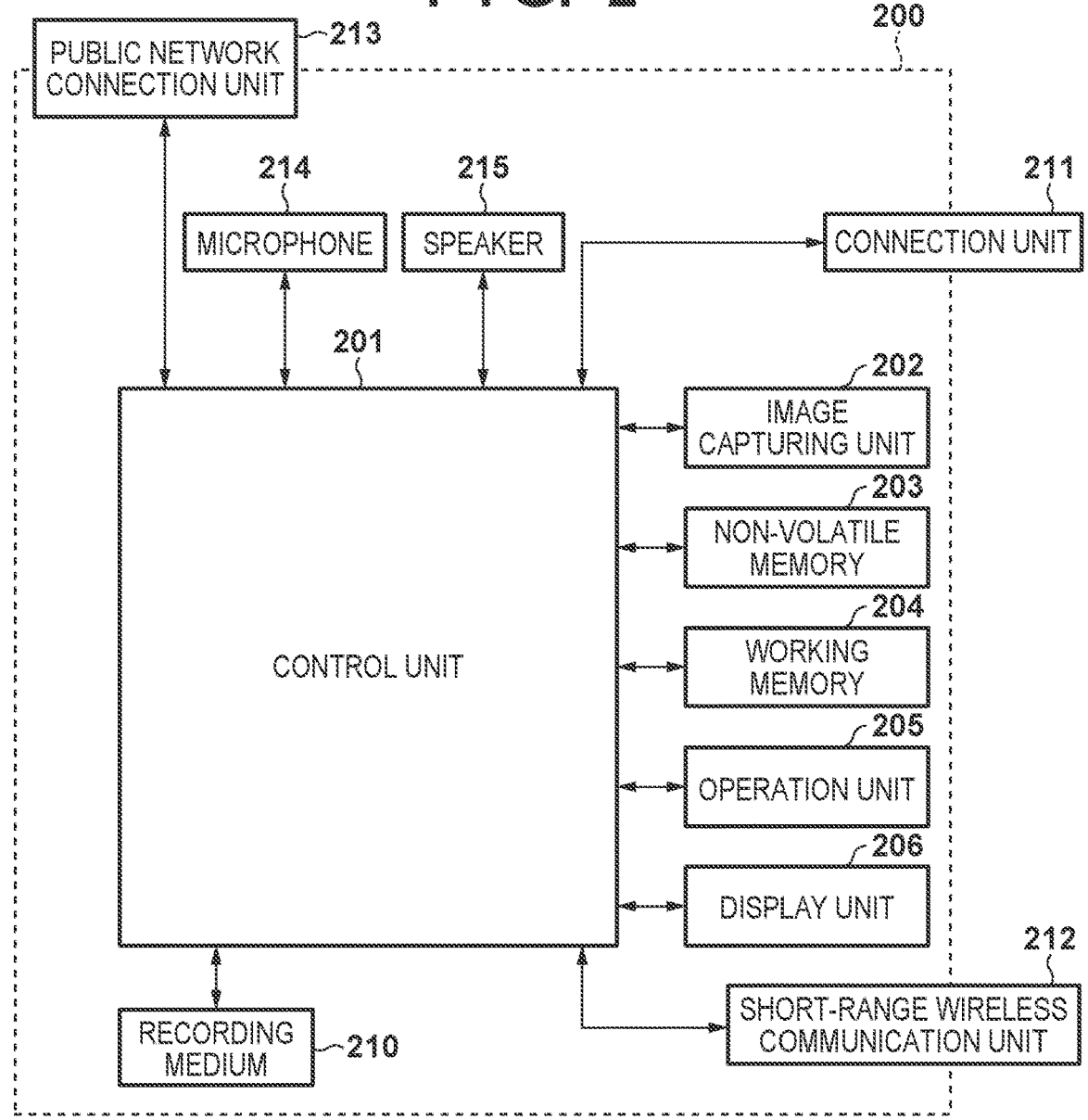
FIG. 2 is a block diagram illustrating a configuration of a mobile device according to the present embodiment.

Next, the hardware configuration of the mobile device 200 according to the present embodiment will be described with reference to FIG. 2.

The mobile device 200 of the present embodiment has a control unit 201, an image capturing unit 202, a non-volatile memory 203, a working memory 204, an operation unit 205, a display unit 206, a recording medium 210, a connection unit 211, and the short-range wireless communication unit 212. The basic functions of these elements are the same as in the digital camera 100, and thus the description will be omitted.

An operating system (OS), which is fundamental software executed by the control unit 201, and applications that cooperate with the OS to implement extended functions are recorded in the non-volatile memory 203. Also, in the present embodiment, a camera communication application for communicating with the digital camera 100 is stored in the non-volatile memory 203.

The processing of the mobile device 200 of the present embodiment is implemented by reading software provided by an application. Note that the application includes software for using the basic functions (for example, a wireless LAN function, a Bluetooth function, a function for invoking another application, and the like) of the OS installed in the mobile device 200. Also, the OS of the mobile device 200 may include software for implementing the control processing according to the present embodiment.

The camera communication application includes a remote shooting function for operating the digital camera 100 remotely via the mobile device 200 and shooting while visually inspecting the live view image output from the digital camera 100 via the mobile device 200. Also, the camera communication application includes a remote viewing function for remotely viewing and remotely receiving image data recorded on a recording medium installed in the digital camera 100.

The connection unit 211 includes an antenna and a communication circuit for wirelessly communicating with an external apparatus such as the digital camera 100. The control unit 201 implements wireless communication with the external apparatus by controlling the connection unit 211. Note that the connection unit 211 may be directly connected to the digital camera 100 or may be connected via an access point. As the protocol for communicating data, Picture Transfer Protocol over Internet Protocol (PTP/IP) via a wireless LAN may be used, for example. Note that the communication with the digital camera 100 is not limited thereto. For example, the connection unit 211 may include a wireless communication interface such as an infrared communication interface, Bluetooth communication module, or a wireless USB.

A public network connection unit 213 is an interface used when wireless communication is performed via a wide area network (WAN), such as 4G/LTE, 5G, or the like. The mobile device 200 is capable of calling an external apparatus and communicating data via the public network connection unit 213. When calling, the control unit 201 performs input and output of audio signal via a microphone 214 and a speaker 215. In the present embodiment, the public network connection unit 213 is not limited to 4G/LTE and 5G and other communication method, such as Local 5G, WiMAX, ADSL, or FTTH may be used. In the present embodiment, the public network connection unit 213 is an antenna, and the control unit 201 can connect to the public network via the antenna. Note that the connection unit 211 and the public network connection unit 213 are not required to be configured by independent hardware and may be implemented by sharing a single antenna, for example.

Note that in the examples described below, the mobile device 200 is described as the subject of the processing, but in practice the processing is implemented by the control unit 201 executing a program stored in the non-volatile memory 203. This is also the case when the digital camera 100 is described as the subject of the processing.

Connection Mode of Digital Camera 100 and Mobile Device 200

Next, connection mode of the mobile device 200 and the digital camera 100 according to the present embodiment will be described with reference to FIGS. 3A and 3B.

Figure 3A:
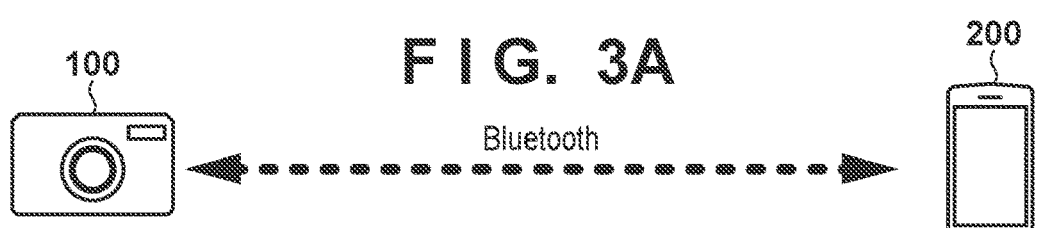
FIGS. 3A and 3B are diagrams illustrating a connection mode for the digital camera and the mobile device according to the present embodiment.

FIG. 3A is a diagram illustrating an example of a state in which the mobile device 200 and the digital camera 100 are connected via Bluetooth (first communication method). In the state in FIG. 3A, the mobile device 200 needs to connect to the short-range wireless communication unit 112 of the digital camera 100 via an operation referred to as pairing which is executed initially for connecting the communication partners 1 on 1 via short-range wireless communication. By the short-range wireless communication unit 212 performing a scan and receiving an advertising signal transmitted from the digital camera 100, the mobile device 200 discovers the digital camera 100 and establishes a connection via an initiation operation. After the Bluetooth connection, the mobile device 200 can execute the functions executable by the digital camera 100 via Bluetooth.

Figure 3B:

FIG. 3B is a diagram illustrating an example of a state in which the mobile device 200 and the digital camera 100 are connected via wireless LAN. By the digital camera 100 operating as a simple AP (AP mode) and the mobile device 200 joining the wireless LAN network created by the digital camera 100, a wireless LAN connection can be established. After the wireless LAN connection, the mobile device 200 can execute the functions of the digital camera 100 executable via a wireless LAN connection. Note that the digital camera 100 according to the present embodiment performs exclusivity control to ensure that a state in which there is simultaneously both a wireless LAN connection and a Bluetooth connection does not come to pass so as to avoid electromagnetic wave interference. The reason electromagnetic wave interference is avoided is because wireless LAN IEEE 802.11b/g/n and Bluetooth are both communication standards that use the same communication frequency band. Accordingly, since exclusivity control is performed for wireless LAN and Bluetooth to avoid electromagnetic wave interference, during a wireless LAN connection, a Bluetooth connection cannot be made, and during a Bluetooth connection, a wireless LAN connection cannot be made. In particular, by exclusively switching between the state in FIG. 3A and the state in FIG. 3B, a function that is executable during a Bluetooth connection or a function that is executable during a wireless LAN connection can be executed.

Bluetooth Connection Processing Sequence

Next, the processing for connecting the digital camera 100 and the mobile device 200 via Bluetooth according to the present embodiment will be described with reference to FIGS. 4A and 4B.

The state of the system before the start of the processing sequence illustrated in FIGS. 4A and 4B corresponds to a state in which the digital camera 100 and the mobile device 200 are in a positional relationship capable of Bluetooth connection.

In the sequence in FIGS. 4A and 4B, the processing is started when the connect via Bluetooth function is enabled in the digital camera 100 and the connect via Bluetooth function is enabled in the mobile device 200.

In T401, the digital camera 100 periodically broadcasts a BLE advertising signal for notifying devices in the surroundings of its presence.

In this case, the BLE advertising signal transmitted from the digital camera 100 includes a connection destination application ID and nickname as the device information of the digital camera 100. Note that the BLE advertising signal includes a smaller area for storing discretionary information than a wireless LAN advertising signal and thus stores only a portion of the device information required for the most recent processing.

When the digital camera 100 performs a request for a new connection, the digital camera 100 sets the connection destination application ID of the device information to blank and transmits a BLE advertising signal.

Also, when the digital camera 100 attempts to reconnect to a specific mobile device 200, the application ID included in the device information of the mobile device being reconnected to is set as the connection destination application ID.

In T402, the mobile device 200 starts processing to search for an advertising signal being broadcast in the surroundings.

In T403, the mobile device 200 receives the BLE advertising signal transmitted by the digital camera 100.

In T404, the mobile device 200 analyzes the received BLE advertising signal and obtains the device information.

Here, when the application ID included in the device information is blank, it is determined to be a new connection request from the digital camera 100, and the processing proceeds to T405. On the other hand, when the application ID matches the application ID of the mobile device 200, it is determined to be a reconnection request from the digital camera 100 to the mobile device 200, and the processing proceeds to T419.

Also, though not illustrated, when the application ID is not blank but also different from the application ID of the mobile device 200, it is determined to be a reconnection request for another device, and the mobile device 200 ends processing.

As the new connection via Bluetooth processing, in T405, the mobile device 200 displays the device information of the digital camera 100 and displays a screen for the user to decide whether or not to start connection. In the present embodiment, "connect" and "cancel" are displayed as options together with the nickname of the digital camera 100. Then, when the user performs an operation to start connection, the processing proceeds to T406. When the user performs an operation to cancel connection, the processing ends.

In T406, when the mobile device 200 receives a connection start operation by the user, the mobile device 200 provides its own application ID and transmits a connection start request to the digital camera 100.

The digital camera 100 determines that the application ID provided to the connection start request from the mobile device 200 is a new connection request on the basis of it not being included in the stored device information and transmits a response to the connection start request.

In T407, when the mobile device 200 receives the response to the connection start request from the digital camera 100, due to it being a new connection, a screen is displayed for the user to decide whether or not to start pairing for encrypted communication via Bluetooth to be performed. Then, when the user performs an operation to start pairing, the processing proceeds to T408. When the user performs an operation to cancel pairing, the processing ends.

In T408, the mobile device 200 generates an encryption key for encrypted communication.

In T409, the mobile device 200 provides the generated encryption key and transmits an encryption key exchange request to the digital camera 100.

In T410, the digital camera 100 stores the encryption key generated by the mobile device 200 and provided to the encryption key exchange request.

In T411, the digital camera 100 generates an encryption key for encrypted communication.

In T412, the digital camera 100 provides the generated encryption key and transmits an encryption key exchange request response to the mobile device 200.

In T413, the mobile device 200 stores the encryption key generated by the digital camera 100 and provided to the encryption key exchange request response.

Via the processing from T408 to T413 described above, encrypted communication between the digital camera 100 and the mobile device 200 is established.

In T414, since both register each others device information in the case of a new connection, the mobile device 200 provides the device information including its own application ID and device name and transmits a registration request to the digital camera 100.

In T415, when the digital camera 100 receives a registration request from the mobile device 200, the digital camera 100 displays a screen for the user to decide whether or not to register the mobile device 200. In the present embodiment, "register" and "cancel" are displayed as options together with the device name of the mobile device 200. The digital camera 100 provides the result of the registration confirmation operation by the user and transmits the registration request response to the mobile device 200.

In T416, the digital camera 100 stores the application ID and device name of the mobile device 200 as the device information.

In T417, the mobile device 200 transmits a wireless LAN Mac address obtaining request to the digital camera 100 to obtain the information of the digital camera 100.

When the digital camera 100 receives the wireless LAN Mac address obtaining request from the mobile device 200, the digital camera 100 provides its own wireless LAN Mac address and transmits a wireless LAN Mac address obtaining request response to the mobile device 200.

In T418, the mobile device 200 stores the nickname and the wireless LAN Mac address of the digital camera 100 as registered camera information.

As the reconnection via Bluetooth processing, in T419, the mobile device 200, without prompting for a user operation, provides the device information including its own application ID and device name and transmits a connection start request to the digital camera 100. The digital camera 100 determines that the application ID included in the device information provided to the connection start request from the mobile device 200 is a reconnection request on the basis of it not being included in the stored device information and transmits a response to the connection start request to the mobile device 200.

In T420, the digital camera 100 reads out the encryption key corresponding to the registered mobile device 200 and starts encrypted communication.

In T421, the mobile device 200 reads out the encryption key corresponding to the registered digital camera 100 and starts encrypted communication.

Via the processing from T420 to T421 described above, encrypted communication between the digital camera 100 and the mobile device 200 is established.

In T422, the mobile device 200 transmits a wireless LAN Mac address obtaining request to the digital camera 100 to obtain the information of the digital camera 100. When the digital camera 100 receive the wireless LAN Mac address obtaining request from the mobile device 200, the digital camera 100 provides its own wireless LAN Mac address and transmits a wireless LAN Mac address obtaining request response to the mobile device 200.

Wireless Lan Connection Processing Sequence

Next, the processing for connecting the digital camera 100 and the mobile device 200 via wireless LAN will be described with reference to FIG. 5.

FIG. 5 is a diagram illustrating an example of the processing sequence until the digital camera 100 and the mobile device 200 establish a wireless LAN connection without a handover from Bluetooth to wireless LAN.

The state before the start of the processing sequence illustrated in FIG. 5 is assumed to be a state in which, for example, the digital camera 100 and the mobile device 200 are joined to the same wireless LAN network created by an external AP.

In the sequence in FIG. 5, the processing is started when the connect via wireless LAN function is enabled in the digital camera 100 and the connect via wireless LAN function is enabled in the mobile device 200.

In T501, the digital camera 100 periodically broadcasts a wireless LAN advertising signal for notifying devices on the same network of its presence.

Here, the wireless LAN advertising signal stores the device information of the digital camera 100 and includes at least the connection destination application ID, the nickname, and the wireless LAN Mac address.

Note that an application ID is an identifier for uniquely identifying the connection destination device, and in the present embodiment, the mobile device 200 can issue its own application ID.

When the digital camera 100 performs a request for a new connection, the digital camera 100 sets the connection destination application ID of the device information to blank and transmits a wireless LAN advertising signal.

Also, when the digital camera 100 attempts to reconnect to a specific mobile device 200, the application ID included in the device information of the mobile device being reconnected to is set as the connection destination application ID.

In T502, the mobile device 200 starts processing to search for a wireless LAN advertising signal being broadcast on the same network.

In T503, the mobile device 200 receives the wireless LAN advertising signal transmitted by the digital camera 100.

In T504, the mobile device 200 analyzes the wireless LAN advertising signal received in T503 and obtains the device information.

Here, when the application ID included in the device information is blank, it is determined to be a new connection request from the digital camera 100, and the processing proceeds to T505.

On the other hand, when the application ID matches the application ID of the mobile device 200, it is determined to be a reconnection request from the digital camera 100 to the mobile device 200, and the processing proceeds to T511.

Also, though not illustrated, when the application ID is not blank but also different from the application ID of the mobile device 200, it is determined to be a reconnection request for another device, and the mobile device 200 ends processing.

As the new connection via wireless LAN processing, in T505, the mobile device 200 displays a screen for the user to decide whether or not to start a wireless LAN connection in order to execute a new connection via wireless LAN. In the present embodiment, "connect" and "cancel" are displayed as options together with the nickname of the digital camera 100.

Here, when the user performs an operation to start connection, the processing proceeds to T506. When the user performs an operation to cancel connection, the processing ends.

In T506, since a new connection is to be started, the mobile device 200 provides the device information of the mobile device including its own application ID and device name and transmits a connection start request to the digital camera 100.

The digital camera 100 determines that the application ID included in the device information of the mobile device provided to the connection start request from the mobile device 200 is a new connection request on the basis of it not being included in the device information of a registered mobile device, and then the processing proceeds to T507.

In T507, when the digital camera 100 receives the connection start request from the mobile device 200, the digital camera 100 displays a screen prompting the user to decide whether or not to allow connection. In the present embodiment, "connect" and "cancel" are displayed as options together with the device name of the mobile device 200. The digital camera 100 provides the result of the connection confirmation operation by the user and transmits the connection start request response to the mobile device 200. When the user allows connection, a connection between the digital camera 100 and the mobile device 200 is established via the connection start request response.

In T508, the digital camera 100 stores the application ID and device name of the mobile device 200 as the device information of the mobile device.

In T509, the mobile device 200 stores the nickname and the wireless LAN Mac address of the digital camera 100 as registered camera information.

In T510, the mobile device 200 stores the information of the wireless LAN connection mode with the digital camera 100 in the non-volatile memory 203. The wireless LAN connection mode according to the present embodiment is a wireless LAN connection using the connection processing sequence described using FIG. 5 or a wireless LAN connection via a handover from Bluetooth to wireless LAN described below. In the sequence in FIG. 5, the wireless LAN connection mode is stored as "direct connection".

As the reconnection via wireless LAN, in T511, the mobile device 200, without requiring a user operation, provides the device information including its own application ID and device name and transmits a connection start request to the digital camera 100.

The digital camera 100 determines that the application ID included in the device information provided to the connection start request from the mobile device 200 is a reconnection request on the basis of it not being included in the device information of a registered mobile device and transmits a response to the connection start request to the mobile device 200. A connection between the digital camera 100 and the mobile device 200 is established via the connection start request response.

Handover Connection Processing

Next, the control processing for connecting the digital camera 100 and the mobile device 200 via a handover from Bluetooth to wireless LAN according to the present embodiment will be described with reference to FIG. 6.

In the present embodiment, by performing a handover from Bluetooth to wireless LAN, the digital camera 100 and the mobile device 200 can establish a wireless LAN connection. A handover from Bluetooth to wireless LAN corresponds to the mobile device 200 receiving information for connecting via wireless LAN from the digital camera 100 when the digital camera 100 and the mobile device 200 connect via Bluetooth and establishing a wireless LAN connection using the received information.

Note that in this example, the digital camera 100 and the mobile device 200 have completed pairing for encrypted communication via Bluetooth and established a Bluetooth connection.

In T601, the mobile device 200 receives an instruction (wireless LAN function execute instruction) to execute a function requiring a wireless LAN connection via a user operation. The wireless LAN function execute instruction is started by a trigger requiring a handover from Bluetooth to wireless LAN while connected via Bluetooth. A trigger may be, for example, the camera communication application accepting an instruction to execute a function (remote shooting function or remote viewing function) requiring a wireless LAN connection. The trigger may also simply be an instruction for a wireless LAN connection.

In T602, when the mobile device 200 receives the wireless LAN function execute instruction via a user operation, the mobile device 200 transmits a simple AP activation request to the digital camera 100 via Bluetooth. When the digital camera 100 receives the simple AP activation request, the digital camera 100 provides the wireless LAN information relating to the wireless LAN network to be created by the simple AP function, transmits a simple AP activation request response to the mobile device 200, and disconnects the Bluetooth connection with the mobile device 200. The wireless LAN information includes information required by the mobile device 200 to join the wireless LAN network such as an SSID and a password. Note that the timing for when the mobile device 200 obtains the wireless LAN information may be a different timing, and the wireless LAN information may be obtained from the digital camera 100 in advance during the Bluetooth connection.

In T603, the digital camera 100 operates as a simple AP and creates a wireless LAN network.

In T604, the digital camera 100 transmits a simple AP activation complete notification to the mobile device 200 to notify the mobile device 200 that a wireless LAN network has been created.

In T605, when the mobile device 200 receives the simple AP activation complete notification from the digital camera 100, the mobile device 200 transmits a wireless LAN connection request to the digital camera 100. When the digital camera 100 receives the wireless LAN connection request from the mobile device 200, the digital camera 100 transmits a wireless LAN connection request response to the mobile device 200 and establishes a wireless LAN connection.

In T606, the mobile device 200 stores the information of the wireless LAN connection mode with the digital camera 100 in the non-volatile memory 203. In the processing sequence in FIG. 6, the wireless LAN connection mode is stored as "handover connection".

Description of Control Processing

According to the present embodiment, the digital camera 100 and the mobile device 200 can connect via Bluetooth or wireless LAN. Also, the digital camera 100 and the mobile device 200 can connect via wireless LAN using a handover from Bluetooth to wireless LAN, and the wireless LAN connection can be performed without requiring the effort of a user operation.

In the camera communication application according to the present embodiment, there is a function requiring a Bluetooth connection and a function requiring a wireless LAN connection. However, in a state in which there is a wireless LAN connection via a handover from Bluetooth to wireless LAN, when the user wants to execute a function requiring a Bluetooth connection, the user has to perform a wireless LAN disconnect operation, reducing user-friendliness.

Regarding this, according to the present embodiment, in a state in which there is a wireless LAN connection via a handover from Bluetooth to wireless LAN, a function requiring a Bluetooth connection can be executed without the user performing a wireless LAN disconnect operation.

Screen of Mobile Device 200

Next, a screen provided by a camera communication application of the mobile device 200 according to the present embodiment will be described with reference to FIGS. 7A to 7D.

The camera communication application of the mobile device 200 according to the present embodiment registers the connected digital camera and generates a screen as operation information, that is a Graphical User Interface (GUI) or the like, for enabling the operation and the execution of functions of each registered digital camera. The user can perform an operation to switch screens per digital camera.

Registering a digital camera and generating a screen will be described below with reference to FIGS. 7A to 7D.

Figure 7A:
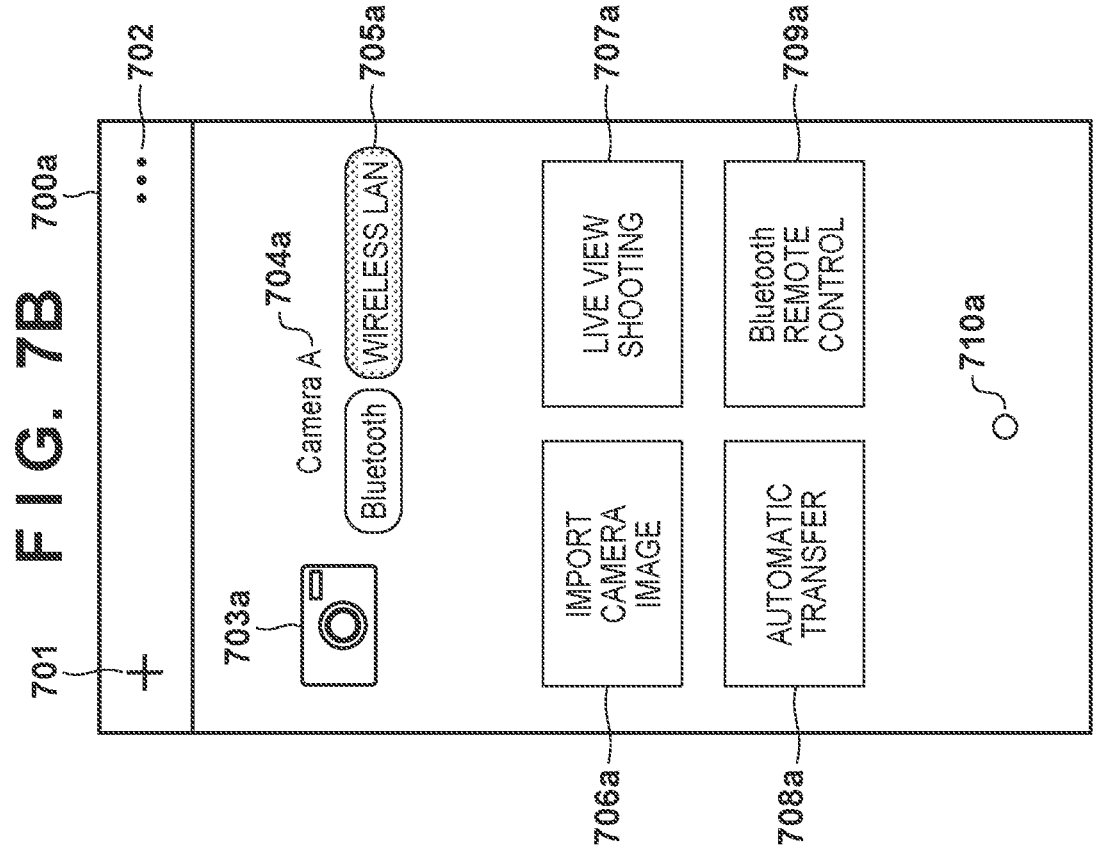

FIG. 7A is a diagram illustrating an example of a screen 700 displayed when not even one digital camera is registered in the camera communication application of the mobile device 200.

A registration button 701 is a button for registering a digital camera in the camera communication application. When the user operates the registration button 701 and performs a predetermined operation to newly connect a digital camera, the digital camera to be connected is registered in the camera communication application, and a screen for the registered digital camera is added to the camera communication application. A confirm button 702 is for displaying on the display unit 206 a list of the information of the digital cameras registered in the camera communication application.

In the state illustrated in FIG. 7A, when the user operates the registration button 701 and performs an operation to connect a digital camera A and the mobile device 200, the digital camera A is registered in the camera communication application. The control unit 201 adds the camera information of the digital camera A to the registered camera information stored in the non-volatile memory 203 and newly generates a screen 700a illustrated in FIG. 7B.

Figure 7B:
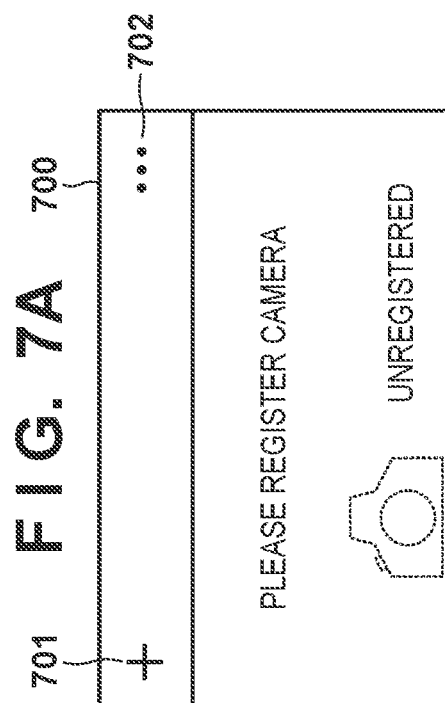

FIG. 7B is a diagram illustrating an example of the screen 700a displayed when the digital camera A is connected via Bluetooth.

An image illustrating the connected digital camera is displayed in an image display portion 703a. In FIG. 7B, an image of the external appearance of the digital camera A is displayed.

An identification name of the connected digital camera is displayed in a name display portion 704a. As illustrated in FIG. 7B, the nickname of the digital camera A is read out from the non-illustrated registered camera information and displayed.

The connection state between the digital camera A and the mobile device 200 is displayed in a connection state display portion 705a. In the present embodiment, a mark indicating the Bluetooth connection state and a mark indicating the wireless LAN connection state are displayed in the connection state display portion 705a.

In this example, the Bluetooth mark is displayed in a bright color while the digital camera A and the mobile device 200 are connected via Bluetooth, and the Bluetooth mark is displayed in a dark color when the Bluetooth connection is disconnected. In a similar manner, the wireless LAN mark is displayed in a bright color while the digital camera A and the mobile device 200 are connected via wireless LAN, and the wireless LAN mark is displayed in a dark color when the wireless LAN connection is disconnected.

As illustrated in the example in FIG. 7B, the mobile device 200 and the digital camera A are connected via Bluetooth, but the wireless LAN connection is disconnected.

In the present embodiment, function buttons 706a to 708a described below correspond to functions executable via a wireless LAN connection, but, since there is a Bluetooth connection, can be enabled via a handover from Bluetooth to wireless LAN. Thus, when the digital camera 100 and the mobile device 200 are connected via Bluetooth, the wireless LAN mark is also displayed.

Function buttons 706a to 709a are function buttons executable when the digital camera A is connected.

The function button 706a is a button for executing the function of displaying an image recorded in the recording medium 110 of the connected digital camera A on the display unit 206.

The function button 707a is a button for executing the function of receiving an image of a live view image from the connected digital camera A and displaying the live view image on the display unit 206 and executing the live view shooting function that enables shooting instructions to be sent to the digital camera A.

The function 708a is a button for setting the automatic transmission function settings for automatically transmitting a captured image to the mobile device 200 at the timing of when the user operates the shutter switch of the operation unit 105 of the digital camera A.

Here, when the functions corresponding to the function buttons 706a to 708a are executed, the digital camera A and the mobile device 200 exchange various data including images and shooting settings data, and thus the communication amount is large.

Thus, in the present embodiment, when the functions corresponding to the function buttons 706a to 708a are executed, the digital camera A and the mobile device 200 execute processing via a wireless LAN connection, which has a faster communication speed. In other words, the functions corresponding to the function buttons 706a to 708a are functions executable during a wireless LAN connection.

The function button 709a is a button for executing a remote control function. Different from the live view shooting function, the remote control function does not receive live view images from the connected digital camera A or display images on the display unit 206 and can only send shooting instructions to the digital camera A.

With the remote control function, only the minimum amount of data for performing a shooting instruction is exchanged between the digital camera A and the mobile device 200, and thus the communication amount is small. Thus, in the present embodiment, when the remote control function is executed, the digital camera A and the mobile device 200 execute processing via a Bluetooth connection. In other words, the remote control function corresponding to the function button 709a is executable during a Bluetooth connection.

The function buttons 706a to 709a described above may be displayed in either an enabled state or a disabled state depending on the connection state between the digital camera A and the mobile device 200.

In the example in FIG. 7B, the digital camera A and the mobile device 200 are connected via Bluetooth.

The remote control function corresponding to the function button 709a is executable during a Bluetooth connection. Thus, as in the example illustrated in FIG. 7B, the function button 709a is displayed in a bright color indicating an enabled state.

However, the functions corresponding to the function buttons 706a to 708a can be executed while the digital camera A and the mobile device 200 are connected via wireless LAN. In this case, if the digital camera A and the mobile device 200 are connected via Bluetooth, by performing a handover from Bluetooth to wireless LAN, the functions corresponding to the function buttons 706a to 708a can be executed. Thus, the function buttons 706a to 708a are also displayed in a bright color indicating an enabled state.

A page display portion 710a indicates the number of digital cameras registered in the camera communication application and the position of the menu screen of the currently displayed digital camera. In the present embodiment, the position of the menu screen of the currently displayed digital camera is indicated with a white dot, and the position of the menu screen of another digital camera is indicated by a black dot.

In the state illustrated by the example in FIG. 7B, only the digital camera A is registered in the camera communication application.

Next, an example in which, from the state illustrated in FIG. 7B, a digital camera B is added and registered in the camera communication application will be described.

From the state illustrated in FIG. 7B, when the user operates the registration button 701 and an operation to connect the digital camera B and the mobile device 200 is performed, the digital camera B is registered in the camera communication application. The control unit 201 adds the camera information of the digital camera B to the non-illustrated registered camera information stored in the non-volatile memory 203 and newly generates and displays a screen 700b illustrated in FIG. 7C. FIG. 7C is a diagram illustrating an example of the screen 700b generated when the digital camera B is connected via wireless LAN. Display components 703b to 710b included on the screen 700b are similar to the display components 703a to 710a in FIG. 7B except that the digital camera in question is the digital camera B.

In FIG. 7C, an image of the external appearance of the digital camera B is displayed in the image display portion 703*b*. Also, the nickname of the digital camera B is read out from the registered camera information and displayed in the name display portion 704*b*.

As illustrated in the example in FIG. 7C, the mobile device 200 and the digital camera B are connected via wireless LAN but have not been connected via Bluetooth. In this case, in the connection state display portion 705*b*, the wireless LAN mark is displayed in a bright color indicating a connected state. Also, the function buttons 706*b* to 708*b* are also displayed in a bright color indicating an enabled state. Furthermore, since the digital camera B and the mobile device 200 are not connected via Bluetooth, the function button 709*b* executable during a Bluetooth connection is displayed in a dark color indicating a disabled state.

Also, as illustrated in FIG. 7C, the digital camera A and the digital camera B are registered in the camera communication application. In this case, in the camera communication application, the screen 700*a* and the screen 700*b* have been generated. When the user drags the screen left and right via the operation unit 205, the control unit 201 switches between displaying the screen 700*a* (FIG. 7B) of the digital camera A and the screen 700*b* (FIG. 7C) of the digital camera B on the display unit 206. In this manner, by switching the displayed screen, the user can select the digital camera to be operated by the camera communication application and execute the desired function.

In the page display portion 710*b*, two circles are displayed indicating that two digital cameras are registered and that two corresponding screens have been generated. The position of the screen of the currently displayed digital camera B is indicated by a white dot.

A disconnect button 711*b* is a button for disconnecting the wireless LAN connection between the digital camera B and the mobile device 200. While the digital camera B and the mobile device 200 are connected via wireless LAN, the disconnect button 711*b* is displayed. When the disconnect button 711*b* is operated, the control unit 201 transmits a disconnect wireless LAN connection request to the digital camera B. When the control unit 101 of the digital camera B receives the disconnect wireless LAN connection request, the control unit 101 stops operating as a simple AP and terminates the created network. In this manner, the wireless LAN connection between the digital camera B and the mobile device 200 can be disconnected.

As illustrated in FIG. 7B, when one of the function buttons 706*a* to 708*a* corresponding to the function executable during a wireless LAN connection is operated, a handover from Bluetooth to wireless LAN is performed. FIG. 7D is a diagram illustrating a screen 700*c* displayed after a handover from Bluetooth to wireless LAN is executed and a wireless LAN connection between the digital camera A and the mobile device 200 is established. In this case, in the connection state display portion 705*a*, both the Bluetooth mark and the wireless LAN mark are displayed in a bright color indicating a connected state. Also, since the digital camera A and the mobile device 200 are connected via wireless LAN, a disconnect button 711*a* for disconnecting the wireless LAN connection is displayed. The function buttons 706*a* to 709*a* are all displayed in a bright color indicating an enabled state. The function buttons 706*a* to 708*a* are displayed in a bright color indicating an enabled state due to there being a wireless LAN connection. The function button 709*a* is displayed in a bright color indicating an enabled state due to there being a Bluetooth connection.

Examples of four functions corresponding to the function buttons 706 to 709 have been described above, but the functions are not limited thereto. As long as the function relates to the registered digital camera, any function may be used. Other examples include changing the settings of a registered digital camera, linking to an external site for the instruction manual, and the like. Also, in the example described above, the digital camera A and the digital camera B can execute the same functions, but the functions that can be executed may differ between the digital cameras, and the number of functions that can be executed may also differ. In such cases, on the screen of each digital camera, function buttons corresponding to the functions that can be executed by the digital camera are displayed.

Processing of Mobile Device 200

Next, control processing for displaying, as appropriate depending on the connection mode, the function button 709 executable during a Bluetooth connection in a state in which the digital camera 100 and the mobile device 200 are connected via wireless LAN according to the present embodiment will be described with reference to the flowchart in FIG. 8.

Note that the processing in FIG. 8 is implemented by a program stored in the non-volatile memory 203 being executed by the control unit 201 of the mobile device 200 and the components of the mobile device 200 being controlled. In this example, when the processing in FIG. 8 is started, the camera communication application of the mobile device 200 is in an activated state.

Also, the processing in FIG. 8 is started at the timing of when the camera communication application renders the screen 700, and the screen 700 is re-rendered at the timing of when the digital camera 100 and the mobile device 200 are connected via wireless LAN.

In step S801, the control unit 201 obtains the mode information of the wireless LAN connection established by the digital camera 100 and the mobile device 200 from the non-volatile memory 203.

In step S802, the control unit 201 determines whether or not the wireless LAN connection has been established via a handover from Bluetooth to wireless LAN on the basis of the wireless LAN connection mode information obtained in step S801. When the control unit 201 determines that the wireless LAN connection has been established via a handover, the processing proceeds to step S803. When the control unit 201 determines that the wireless LAN connection has been established without a handover, the processing proceeds to step S804.

In step S803, the control unit 201 displays the buttons corresponding to the executable functions requiring a Bluetooth connection on the display unit 206.

By executing the processing of step S803, the screen 700 illustrated in FIG. 7D is displayed. When the function button 709 requiring a Bluetooth connection is displayed as enabled by the control unit 201 and the user operates the function button 709, the wireless LAN connection is disconnected. Thereafter, Bluetooth is reconnected, and the function requiring a Bluetooth connection is executed. The details will be described below using FIG. 9.

When the user connects via wireless LAN via a handover from Bluetooth to wireless LAN, a function requiring a Bluetooth connection can be executed without the user performing an operation to disconnect the wireless LAN connection.

In step S804, the control unit 201 displays the functions requiring a Bluetooth connection in a non-executable state on the display unit 206.

By executing the processing of step S804, the screen 700*c* illustrated in FIG. 7C is displayed. Only the functions requiring a wireless LAN connection are displayed as enabled by the control unit 201, and the functions requiring a Bluetooth connection are displayed as disabled.

In this manner, when the user has established a wireless LAN connection without a handover from Bluetooth to wireless LAN, the functions requiring a Bluetooth connection cannot be executed.

According to the processing described above, the control unit 201 can switch between enabling and disabling the execution of a function button requiring a Bluetooth connection depending on the mode of the wireless LAN connection between the digital camera 100 and the mobile device 200. When the wireless LAN connection mode is a handover from Bluetooth to wireless LAN, the function buttons requiring a Bluetooth connection are displayed as enabled. Thus, the user can execute the functions requiring a Bluetooth connection without performing an operation to disconnect the wireless LAN connection.

Processing Sequence Until Execution of Function Requiring Bluetooth Connection

Next, processing executed when the mobile device 200 receives an instruction (Bluetooth function execute instruction) to execute a function requiring a Bluetooth connection via a user operation in a state in which the digital camera 100 and the mobile device 200 are connected via wireless LAN according to the present embodiment will be described with reference to FIG. 9.

Figure 9:
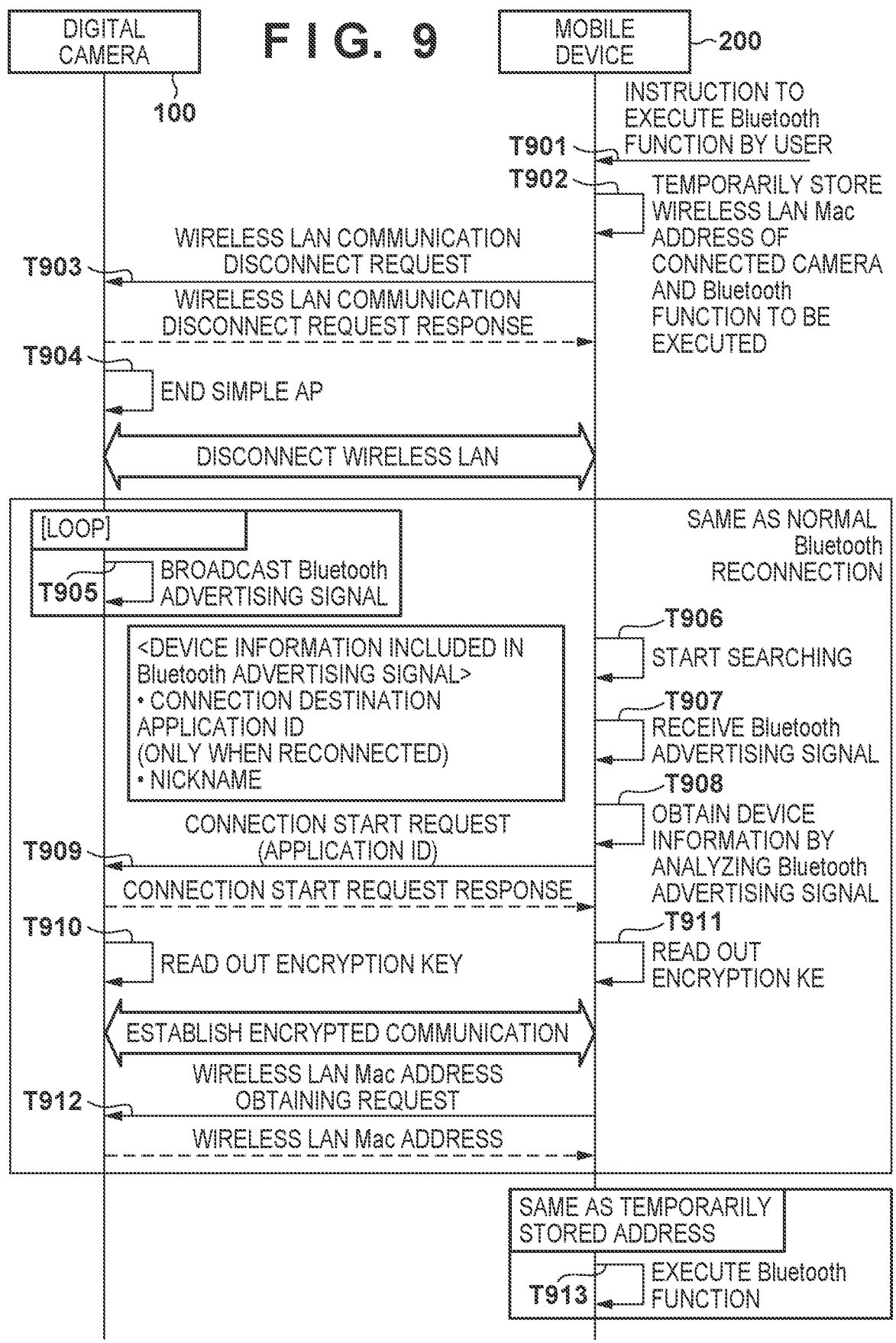
FIG. 9 is a sequence diagram illustrating control processing executed when the digital camera and the mobile device are connected via a handover according to the present embodiment.

The state of the system before the start of the sequence illustrated in FIG. 9 corresponds to a state in which the digital camera 100 and the mobile device 200 are connected via wireless LAN via a handover from Bluetooth to wireless LAN and in a positional relationship capable of Bluetooth connection.

In T901, the mobile device 200 receives a Bluetooth function execute instruction from the user. The Bluetooth function execute instruction corresponds to an operation of the function button 709a by the user on the screen 700c in FIG. 7D. It may also simply be an instruction for a Bluetooth connection.

In T902, when the mobile device 200 receives the Bluetooth function execute instruction from the user, the mobile device 200 temporarily stores the wireless LAN Mac address of the digital camera currently connected via a wireless LAN connection via a handover from Bluetooth to wireless LAN and the Bluetooth function to be executed. This is for determining, in T902, whether or not the digital camera connected via Bluetooth reconnection processing described below and the digital camera currently connected to the mobile device 200 are similar.

In T903, the mobile device 200 transmits a wireless LAN disconnect request to the digital camera 100 to disconnect the wireless LAN connection with the digital camera 100. When the digital camera 100 receives the wireless LAN disconnect request from the mobile device 200, the digital camera 100 transmits a wireless LAN disconnect response to the mobile device 200.

In T904, when the digital camera 100 transmits the wireless LAN disconnect response to the mobile device 200, the digital camera 100 ends its simple AP and disconnects the wireless LAN connection with the mobile device 200.

When disconnection of the wireless LAN connection is complete, in T905 to T912, the digital camera 100 and the mobile device 200 execute Bluetooth reconnection processing. The Bluetooth reconnection processing in T905 to T912 is similar to the processing in T401 to T404 and T419 to T422 in FIGS. 4A and 4B.

In T913, the mobile device 200 compares the wireless LAN Mac address of the digital camera reconnected via Bluetooth and the wireless LAN Mac address of the digital camera temporarily stored in T902. When the wireless LAN Mac addresses match, in T913, the mobile device 200 determines that the digital camera connected in T902 and the currently connected digital camera are the same and executes the Bluetooth function temporarily stored in T902. When there is no match, in T913, the mobile device 200 determines that the digital camera connected in T902 and the currently connected digital camera are not the same, and the mobile device 200 ends processing.

Via the sequence described above, in a state in which the digital camera 100 and the mobile device 200 are connected via wireless LAN via a handover from Bluetooth to wireless LAN, a function requiring a Bluetooth connection can be executed without a user performing an operation to disconnect the wireless LAN connection with the digital camera 100.

According to the present embodiment, when the connection mode of the wireless LAN connection between the digital camera 100 and the mobile device 200 is a handover from Bluetooth to wireless LAN, the function requiring a Bluetooth connection is displayed in an executable state on the screen 700c illustrated in FIG. 7D.

Specifically, even when a wireless LAN connection and a Bluetooth connection are exclusively switched between and a function requiring a Bluetooth connection cannot be executed during a wireless LAN connection, in a case in which the wireless LAN connection mode is a handover from Bluetooth to wireless LAN, depending on whether a Bluetooth function execute instruction has been received via a user operation, the wireless LAN connection with the digital camera 100 is disconnected and Bluetooth reconnection processing is executed to execute the desired Bluetooth function.

In this manner, a function requiring a Bluetooth connection can be executed without the user performing an operation to disconnect the wireless LAN connection. Thus, user-friendliness can be improved.

Other Embodiments

In the embodiment described above, the digital camera 100 that performs wireless communication with the mobile device 200 exclusively switches between a wireless LAN connection and a Bluetooth connection to avoid electromagnetic wave interference. However, no such limitation is intended. For example, the digital camera 100 may be a camera that is able to simultaneously connect via both Bluetooth and wireless LAN.

Also, when the camera communication application according to the present embodiment indicates whether a function requiring a Bluetooth connection is able to be executed or unable to be executed, a bright color is used to display the function button when it is executable and a dark color is used to display the function button when it is not executable. However, no such limitation is intended. For example, the function button may be displayed when a function requiring a Bluetooth connection is executable and not displayed when not executable.

Also, if the function button is always displayed irrespective of the communication state and the function button is operated when in a non-executable state, an error message or a similar notification may be used to indicate that it cannot be executed.

Also, in the present embodiment, Bluetooth is used as a first wireless communication method for performing a handover from Bluetooth to wireless LAN, but no such limitation is intended. For example, Near Field Communication (NFC) may be used as the first wireless communication method.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-156467, filed Sep. 29, 2022 which is hereby incorporated by reference herein in its entirety.

What is claimed is:

1. A communication apparatus comprising:
   a first communication unit that is connectable to an external apparatus via a first wireless communication method;
   a second communication unit that is connectable to the external apparatus via a second wireless communication method different from the first wireless communication method; and
   a control unit that, in a state in which the communication apparatus is connected with the external apparatus via the first communication unit, enables execution of a first function of the external apparatus requiring a connection via the first communication unit and, in a state in which the communication apparatus is connected with the external apparatus via the second communication unit, enables execution of a second function of the external apparatus requiring a connection via the second communication unit,
   wherein, when the control unit accepts an instruction to execute the first function in a state in which the communication apparatus is connected to the external apparatus via the second communication unit using a connection with the first communication unit, the control unit disconnects a connection with the external apparatus via the second communication unit and executes the first function.

2. The apparatus according to claim 1, wherein
in a case where the control unit accepts an instruction to execute the second function in a state in which the communication apparatus is connected to the external apparatus via the first communication unit, the control unit enables execution of the second function by connecting to the external apparatus via the second communication unit using a connection with the first communication unit.

3. The apparatus according to claim 1, wherein
the control unit disables execution of the first function and enables execution of the second function in a state in which the communication apparatus is connected to the external apparatus via the second communication unit without using a connection with the first communication unit.

4. The apparatus according to claim 1, wherein
the control unit generates operation information for operating the external apparatus,
generates operation information able to accept an instruction to execute the first function and the second function in a state in which the communication apparatus is connected to the external apparatus via the second communication unit using a connection with the first communication unit, and
generates operation information able to accept an instruction to execute the second function in a state in which the communication apparatus is connected to the external apparatus via the second communication unit without using a connection with the first communication unit.

5. The apparatus according to claim 4, wherein
the control unit generates operation information able to accept an instruction to execute the first function and the second function in a state in which the communication apparatus is connected to the external apparatus via the first communication unit, and
in a case where the control unit accepts an instruction to execute the second function, executes the second function by connecting to the external apparatus via the second communication unit using a connection with the first communication unit.

6. The apparatus according to claim 4, wherein
the control unit displays the operation information in a state able to accept an instruction to execute the first function in a case where the first function is executable, and displays the operation information in a state unable to accept an instruction to execute the first function in a case where the first function is not executable.

7. The apparatus according to claim 4, wherein
the control unit displays the operation information in a state able to accept an instruction to execute the first function in a case where the first function is executable, and does not display the operation information in a case where the first function is not executable.

8. The apparatus according to claim 1, wherein
the control unit exclusively switches between a state in which the communication apparatus is connected with the external apparatus via the first communication unit and a state in which the communication apparatus is connected to the external apparatus via the second communication unit, and
in a case where the control unit accepts an instruction to execute the first function in a state in which the communication apparatus is connected to the external apparatus via the second communication unit using a connection with the first communication unit, disconnects a connection via the second communication unit, performs a reconnection via the first communication unit, and executes the first function.

9. The apparatus according to claim 1, wherein
in a case where the control unit accepts an instruction to execute the first function or the second function while the first function or the second function is not executable, the control unit notifies that the first function or the second is not executable.

10. The apparatus according to claim 1, wherein
the first wireless communication method has a slower communication speed and a narrower communicable range than the second wireless communication method.

11. The apparatus according to claim 1, wherein
the first wireless communication method is Bluetooth®, the second wireless communication method is wireless local area network (LAN), and
the external apparatus is an image capture apparatus.

12. A method of controlling a communication apparatus comprising:
wherein the communication apparatus includes
a first communication unit that is connectable to an external apparatus via a first wireless communication method, and
a second communication unit that is connectable to an external apparatus via a second wireless communication method different from the first wireless communication method, and
wherein the method includes
performing control to, in a state in which the communication apparatus is connected with the external apparatus via the first communication unit, enable execution of a first function of the external apparatus requiring a connection via the first communication unit and, in a state in which the communication apparatus is connected with the external apparatus via the second communication unit, enable execution of a second function of the external apparatus requiring a connection via the second communication unit, and
in performing the control, in a case where the control unit accepts an instruction to execute the first function in a state in which the communication apparatus is connected to the external apparatus via the second communication unit using a connection with the first communication unit, disconnecting a connection with the external apparatus via the second communication unit and executing the first function.

13. A non-transitory computer-readable storage medium storing a program for causing a computer to function as a communication apparatus comprising:
a first communication unit that is connectable to an external apparatus via a first wireless communication method;
a second communication unit that is connectable to the external apparatus via a second wireless communication method different from the first wireless communication method; and
a control unit that, in a state in which the communication apparatus is connected with the external apparatus via the first communication unit, enables execution of a first function of the external apparatus requiring a connection via the first communication unit and, in a state in which the communication apparatus is connected with the external apparatus via the second communication unit, enables execution of a second function of the external apparatus requiring a connection via the second communication unit,
wherein, when the control unit accepts an instruction to execute the first function in a state in which the communication apparatus is connected to the external apparatus via the second communication unit using a connection with the first communication unit, the control unit disconnects a connection with the external apparatus via the second communication unit and executes the first function.

* * * * *